United States Patent [19]

Takada

[11] 4,418,940
[45] Dec. 6, 1983

[54] COUPLING ASSEMBLY FOR THE DRIVE DEVICE OF A PASSIVE VEHICLE OCCUPANT RESTRAINT BELT SYSTEM

[76] Inventor: Juichiro Takada, 3-12-1, Shinmachi, Setagayaku, Tokyo, Japan

[21] Appl. No.: 267,891

[22] Filed: May 28, 1981

[30] Foreign Application Priority Data

Jun. 13, 1980 [JP] Japan .............. 55-081832[U]

[51] Int. Cl.³ .............................................. B60R 21/00
[52] U.S. Cl. ................................... 280/804; 297/469
[58] Field of Search ............... 280/802, 803, 804, 806; 297/469; 49/475; 277/102

[56] References Cited

U.S. PATENT DOCUMENTS 4,222,587  9/1980  Goi et al. ......................... 280/804
4,256,331  3/1981  Schwanz et al. .................. 280/804

Primary Examiner—Richard A. Bertsch
Attorney, Agent, or Firm—Brumbaugh, Graves, Donohue & Raymond

[57] ABSTRACT

A coupling assembly for connecting the drive wire of a passive vehicle occupant restraint belt system to a guide rail includes a sealing ring that engages the drive wire and keeps lubricant confined to the casing.

4 Claims, 7 Drawing Figures

COUPLING ASSEMBLY FOR THE DRIVE DEVICE OF A PASSIVE VEHICLE OCCUPANT RESTRAINT BELT SYSTEM

FIELD OF THE INVENTION

The present invention relates to passive vehicle occupant restraint belt systems and, in particular, to an improved coupling for joining the casing for the drive wire to the guide rail.

BACKGROUND OF THE INVENTION

In recent years there have been numerous proposals for passive vehicle occupant restraint belt systems, i.e., restraint belt systems which automatically transfer from a configuration in which a shoulder belt, a lap belt, or both a shoulder belt and a lap belt restrain the vehicle occupant, and a configuration in which they move out of the way of the occupant and allow him or her to enter or leave the vehicle. Usually the transfer of the system between restraint and release configurations is initiated when the vehicle door is opened and closed.

Many of the proposed systems have a moving anchor or a movable guide ring that slides along a guide rail located at the inside edge of the vehicle roof above the door, on the door panel or at an inboard location adjacent the seat. The moving anchor or movable guide ring is driven in some of the proposed systems by a wire that is sufficiently stiff to transmit motion in the pushing direction to the moving anchor or guide ring, but sufficiently flexible to enable it to bend along a non-linear path. Proper operation of such a drive wire ordinarily requires that the wire be enclosed within a casing and that the casing be secured adjacent the guide rail and at some other location fairly close to the drive motor or mechanical motion transmitter which drives the wire, thereby to constrain the drive wire for movement along a prescribed path of a prescribed length, as defined by the casing. A common type of drive wire is a so-called racked wire, which consists of a core wire and a helically wound tooth wire, that is driven by the output gear of a gear-reduced electric motor or a mechanical motion amplifier.

A number of requirements are imposed upon the casing and the drive wire to ensure effective, trouble-free operation of the drive system over the life of the vehicle. For one thing, the casing must be securely fastened so that it can endure thousands of cycles of operation of the system. The casing must also enable the movement of the drive wire through it as freely as possible in order to minimize the forces imposed on the wire, the motor or other drive device and the casing itself. The space within the casing should also be protected from intrusion of dirt and moisture that might damage the wire, such as by wearing, or interfere with the free movement of the wire through the casing. The devices for joining the casing to the guide rail and connecting up the system during final installation in the vehicle must take into account the practicalities of assembly line production techniques, which make it desirable that the system be capable of being installed as various subassemblies and then ultimately connected up at a convenient point in the assembly operation in a minimum of time. Inasmuch as the drive wire reciprocates back and forth within the casing and through the guide rail along the path that is partly curved and partly straight, the wire is subjected to repeated flexure, care must be taken that the guide wire is not subject to fatigue, particularly at some sort of splice or other type of connection that involves an abrupt transition between a comparatively flexible section and a comparatively rigid section where stress concentration may occur. Finally, the design of the system should take into account the possibility that it may be damaged and require repair or replacement of certain components. This possibility makes it desirable for there to be some way of readily disassembling the system in a manner that minimizes the number of components involved in the dissambly and also facilitates replacement of various components or subassemblies while leaving other components or subassemblies in place. Similarly, the reconnection of a repaired system should be provided for in a manner which can be easily accomplished with simple tools.

The inventor of the present invention has concurrently with the present invention proposed an improved connector for joining the casing of a drive wire to the end of a guide rail in a manner which is very simple to carry out, yet highly effective in producing a durable connection between the casing and the guide rail. That related invention is the subject of co-pending U.S. patent application Ser. No. 272,358, filed June 10, 1981 entitled "Connecting Member for Passive Seat Belt Systems" and corresponding Japanese Priority Utility Model Application No. 55-081831, filed June 13, 1980. The aforementioned invention makes no provision for retention of a lubricant in the casing and prevention of intrusion of lubricant into the guide rail, from where it might possibly reach other parts of the vehicle or the occupant's garments or otherwise become objectionable. Moreover, the lack of any confinement of the lubricant means that the lubricant will be lost over a period of time and will become less effective.

In the case of a system which utilizes a racked wire driven by an output gear of the drive device, it is highly desirable for the racked wire and gear to be lubricated for smooth running, minimum wear and consequent long life. Inasmuch as the racked wire moves back and forth to an extent equal to the distance along which the moving anchor or moving belt guide moves along the rail, it is inevitable that after only a few cycles of operation, the lubricant will move into and through the casing and ultimately be carried by the part of the drive wire that moves along the guide rail to the guide rail. Eventually, it is certainly possible that lubricant that reaches the guide rail will accumulate and at some time start dropping onto the floor or seat of the vehicle or perhaps flow along the moving anchor or guide and get on the belt. At the very least, the lubricant will contaminate the guide rail and diminish its appearance, particularly as dirt tends to accumulate by sticking to the lubricant. Exposure of a lubricant to the interior of the vehicle will inevitably result in the collection of dirt, particularly when the vehicle is operated in dusty conditions in dry climates. Contamination of the guide rail can lead to wear of the rail and the slider that moves along the rail and also can reduce the freedom with which the slider moves along the rail.

SUMMARY OF THE INVENTION

It is an object of the present invention to satisfy all of the above-mentioned objectives of the drive systems of passive vehicle occupant restraint belt systems and, in particular, to overcome the problem of leakage of lubricant from the drive wire and the casing to the rail. There is provided, in accordance with the present invention, a coupling for joining the casing for a drive wire of a passive occupant restraint belt system to the guide rail in a manner which is durable, and easy to connect and disconnect, thus facilitating the manufacturing operations as well as any necessary repair. Most importantly, it eliminates the migration of lubricant from the drive device to the guide rail. On the other hand, lubricant is allowed to enter the casing for the drive wire and thus contribute to the free movement of the drive wire through the casing. The connector also makes provision for direct connection of the wire to the slider without any interruption or splice that might cause the failure of the wire.

More particularly, the connector, according to the present invention, comprises a socket that is adapted to receive and hold the end of the casing adjacent the end of the guide rail and a connector portion fitted to the guide rail and joined to the guide rail, preferably in a manner which facilitates connecting and disconnecting it at initial assembly and during any necessary repair procedure. The coupling has a hole that communicates the socket with the guide rail and that receives the drive wire for longitudinal movement. A sealing ring is received within the hole in sealing engagement with the drive wire to confine the lubricant to the casing and prevent it from intruding into the guide rail itself.

In a preferred embodiment, the coupling is made in two parts, each which defines a portion of the socket and a portion of the hole through which the drive wire passes, and a fastener releasably joins the two parts to facilitate removing the connector from the casing for service or repair of the belt system. Advantageously, the connector may be joined to a guide rail by at least one resilient lug having a projection that fits into a recess in the guide rail. The sealing ring is preferably composed of an elastomeric material that is resistant to deterioration when exposed to a petroleum-based lubricant, an example being a butadieneacrylonitrile rubber.

For a better understanding of the invention, reference may be made to the following description of exemplary embodiment, taken in conjunction with the figures of the accompanying drawings.

DESCRIPTION OF EXEMPLARY EMBODIMENT

Figure 1:
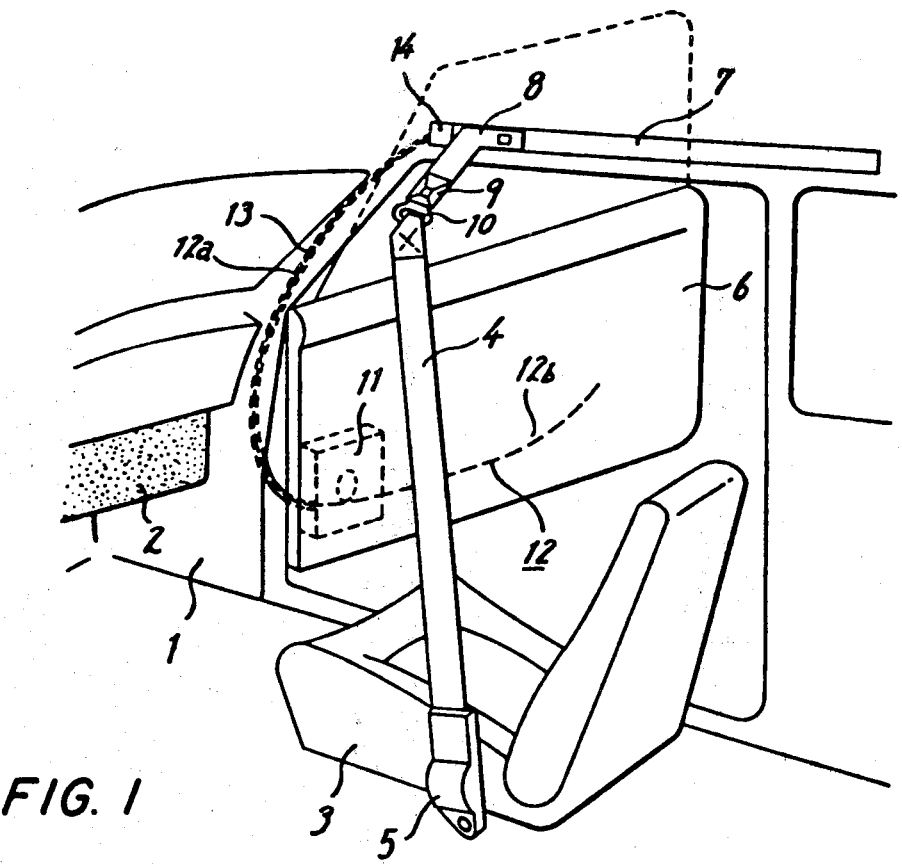
FIG. 1 is a pictorial view in generally schematic form of an example of a restraint belt system with which the present invention can be used.

The passive vehicle occupant restraint belt system shown in FIG. 1 is designed for use in conjunction with the front seat 3 of vehicle 1 and comprises an energy absorbing knee bolster 2 located under the dashboard of the vehicle for protecting the lower body of the occupant of the seat in the event of a collision or sudden stop. A shoulder belt 4 extends from an emergency locking retractor 5 located adjacent the lower rear inboard portion of the seat and suitably anchored to the vehicle floor. The outboard end of the shoulder belt 4 is fastened, such as by sewing a loop of the belt 4 back on itself, to a buckle tongue 10 that is connected to an emergency release buckle 9 carried by a moving anchor 8. The moving anchor 8 slides backward and forward along a guide rail 7 that is installed at the inside edge of the vehicle roof generally above the vehicle door 6.

The moving anchor 8 is driven by a drive system between a release position adjacent the front end of the guide rail (the position shown in FIG. 1) and a restraint location adjacent the rear end the guide rail (not shown). The drive system comprises a drive wire 12 having a racked wire portion 12b driven by the output gear of a drive device 11 and, as described and shown in more detail below, a covered portion 12a that runs within a casing 13 that is connected to the front end of the guide rail 7 by a coupling 14. The drive device 11 may be a gear-reduced electric motor or mechanical motion amplifier. Various systems for controlling an electric motor and various mechanical motion amplifier systems that use the opening and closing motions of the door 6 to drive an output gear are known in the prior art.

The passive belt system shown in FIG. 1 is merely exemplary of various systems involving a guide rail and a drive wire with which a coupling embodying the present invention may be employed. Such systems may use a movable guide ring instead of a movable anchor and may be associated with a guide rail on the vehicle door panel or a guide rail located inboard of the seat.

Figure 2:
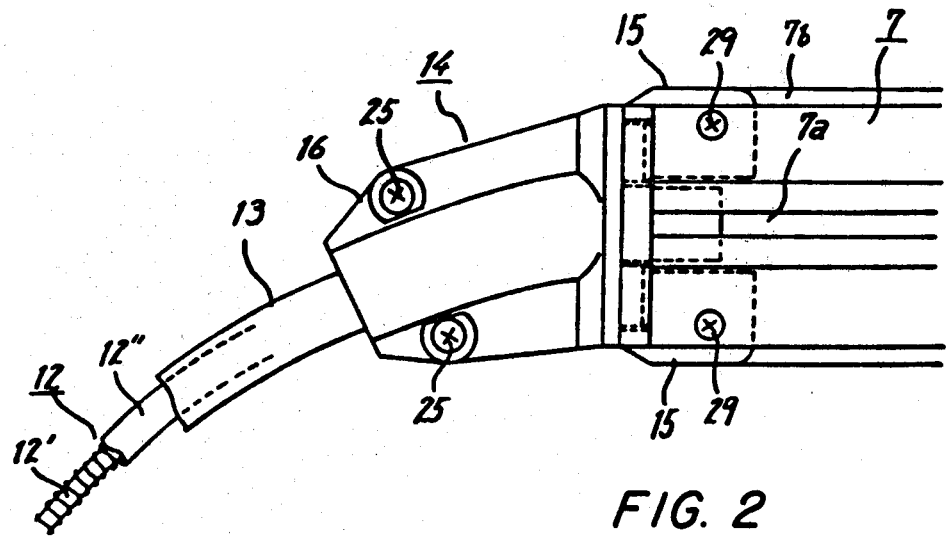
FIG. 2 is a plan view of one embodiment of the coupling.
Figure 3:
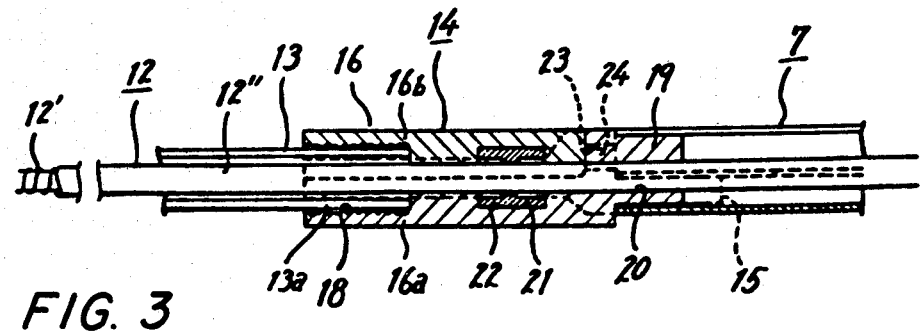
FIG. 3 is a side cross-sectional view of the coupling shown in FIG. 2, taken generally along the axis of the drive wire.
Figure 4:
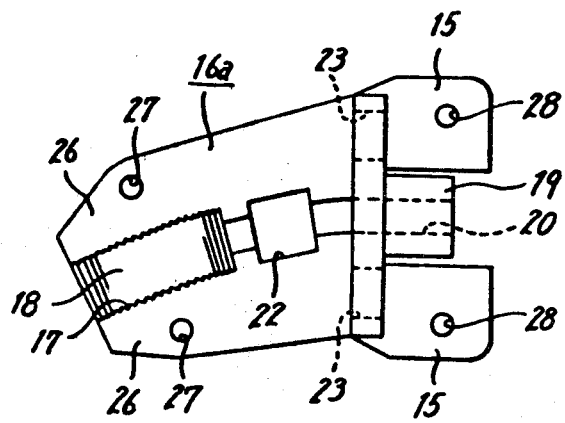
FIG. 4 is a plan view of one part of the coupling of FIGS. 2 and 3, the view being of the inside face of the part.
Figure 5:
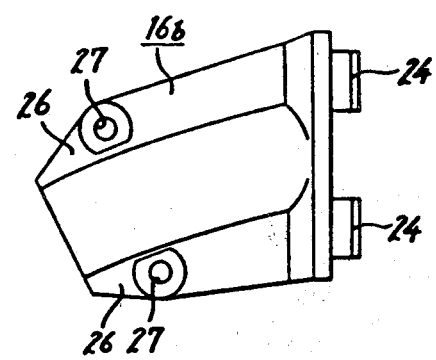
FIG. 5 is a plan view of the outside face of the other part of the coupling shown in FIGS. 2-4.

As shown in FIGS. 2 and 3, a suitable drive wire for a moving anchor or movable belt guide is a racked wire 12', which consists of a core wire wound with a helical tooth wire. The portion of the racked wire that engages the output gear of the drive mechanism in operation is, of course, uncovered, but to minimize wear, produce smooth running and reduce possible noise, at least that portion of the drive wire 12 that moves back and forth along the guide rail in operation of the system has a covering 12" of a suitable polymeric material, such as a polyamide.

The casing 13 defines the path of the drive wire 12. The casing is preferably a tubing of a polymeric material and is suitably joined to the vehicle body or the door near the drive mechanism 11 and is joined by the coupling 14 to the front end of the guide rail 7. The embodiment of the coupling 14 shown in FIGS. 2 to 5 comprises a socket 18 having small helical ridges 17, serrations or any suitable gripping surface, and is of a diameter equal to or slightly less than the outer diameter of the casing 13. The coupling 14 is made in two pieces, a base part 16a and a cover part 16b which together constitute the coupling member 16 of the coupling assembly 14. The base part 16a has a pair of laterally spaced-apart connector portions 15 in the form of lugs or tabs that interfit in between flanges 7c and 7d that extend outwardly on both sides of a generally channel-shaped body portion 7e of the guide rail 7. The connector portions 15 have holes 28 that receive screws 29 that pass through the flange 7d and secure the coupling assembly 14 to the rail 7.

The inner faces of the two parts 16a and 16b define portions of the socket 18 and portions of a hole 20 that communicates the inner end of the socket with the channel-shaped guide way 7a of the guide rail 7. The covered portion 12" of the guide wire 12 passes from the casing 13 through the hole 20 and leads into the channel portion 7a through a boss 19 that extends into the guide rail. Partway along the length of hole 20 is a cylindrical cavity 22 defined by semi-cylindrical recesses that open at the abutting faces of the respective parts 16a and 16b. This cylindrical cavity 22 receives an oil sealing ring 21. The two parts 16a and 16b are joined to each other by, first of all, a pair of lugs 24 on the cover part 16b that extend into and interlock with matching holes 23 in the base part 16a and by bolts and nuts 25 which pass through aligned holes 27 in the respective parts 16a and 16b on either side of the socket portion 26 of the coupling member.

The sealing ring 21 includes an inwardly extending bead that is of a diameter equal to or slightly less than the outer diameter of a covering 12' of the drive wire 12 and engages the wire firmly to keep lubricant from being carried by the drive wire into the guide rail. It should be made of a material that is resistant to deterioration in the presence of a petroleum-based lubricant and also resistant to wear. A preferred material is a synthetic rubber, such as a butadiene acrylonitrile rubber. A synthetic rubber foam may also be used, but it should be a high density foam producing a strong elastic force in order to provide an effective seal.

To install a seat belt system having the improved connector embodying the present invention, the drive wire 12 is installed in the casing 13 and pushed through the sealing ring 21 and through the hole 20 in the projecting boss 19 of the connector part 16a. A suitable adhesive is applied to the outer surface of the part of the casing 13 received in the socket 18, the casing 13 is inserted in the socket and the two parts 16a and 16b are joined with the nuts and bolts 25. At this point the coupling 14 has not yet been connected to the guide rail 7.

In most cases it will be convenient for the retractor to be supplied with the moving anchor 8 attached to the belt 4 by means of the buckle 9 and for the retractor 5 to have been installed in the vehicle. In such a case, the belt is pulled out, and the end of the drive wire 12 is attached to the moving anchor 8. The moving anchor 8 is then slided endwise onto the guide rail. At this point, the coupling 14 can be inserted into the end of the guide rail and the screws 29 installed, thereby durably fastening the coupling to the guide rail.

Should there be any need to disassemble the belt system for maintenance or repair, the coupling 14 can be removed from the guide rail by taking out the screws 29. The moving anchor 8 can then be removed from the guide rail. If necessary, the coupling 14 can be taken apart by removing the bolts and nuts 25. Such disassembly facilitates various repairs, such as replacing the moving anchor 9, the guide rail 7 or the drive wire, and the reassembly of the system is equally easy to accomplish.

Figure 6:
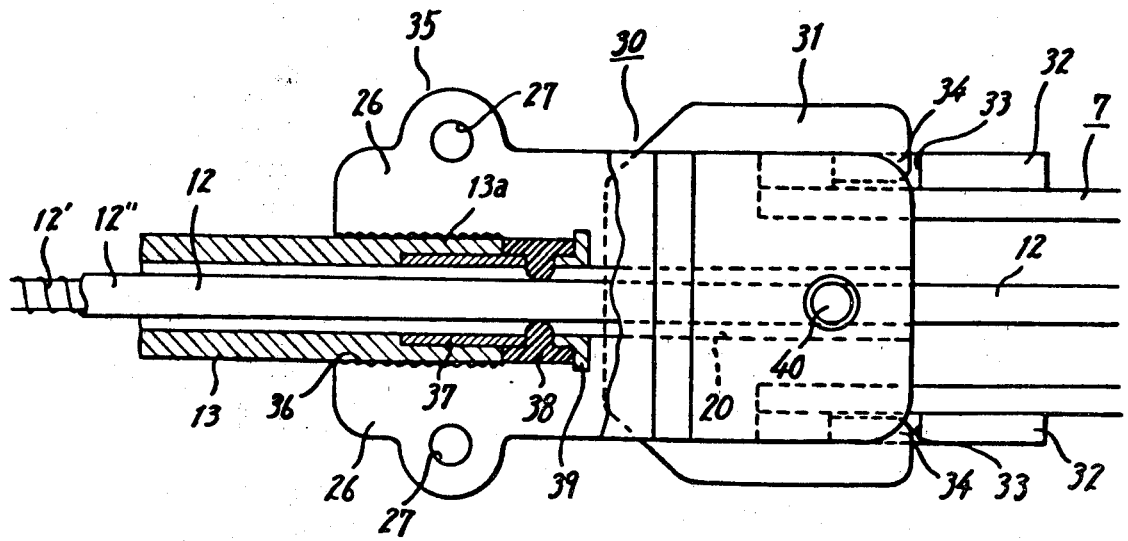
FIG. 6 is a plan view of another embodiment of the invention, portions being shown in cross-section or cut away.
Figure 7:
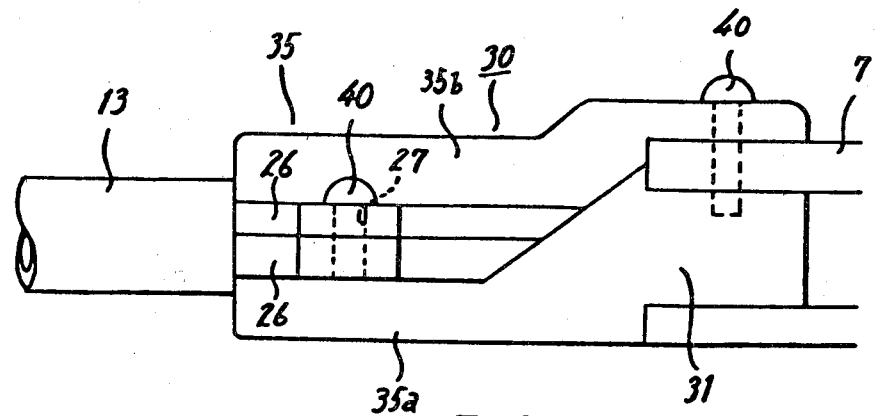
FIG. 7 is a side elevational view of the coupling shown in FIG. 6.

The embodiment shown in FIGS. 6 and 7 is similar in many respects to the embodiment of FIGS. 2 to 5. Accordingly, the same reference numerals are applied to similar or identical components, such as the wire 12 and the guide rail 7. The coupling assembly 30 comprises a coupling member 35 composed of a base part 35a and a cover part 35b. The socket portion 26 of the coupling member has a socket 36 having grooves or serrations for gripping the end portion 13a of the casing 13. A stiffener ring 37 installed within the end portion of the casing enhances the durability of the attachment of the casing and also bears against the side of a sealing bead of a sealing ring 38. A seal retainer 39 bears against the other side of the sealing bead. In this way, the sealing bead is firmly supported for effective sealing with the drive wire 12. The two parts of the coupling member are joined by screws or by bolts and nuts 40 that are installed in corresponding holes, for example the holes 27.

The base part 35a of the coupling component has a pair of resilient flanges 31, each of which has an inwardly projecting lug 34 that is received in a notch or hole 33 in a reinforcing part 32 fastened to the end of the guide rail 7. Accordingly, the embodiment of the coupling assembly shown in FIGS. 6 and 7 is assembled to guide rail 7 by merely pushing it endwise onto the end of the rail, thereby causing the flanges 31 to deflect outwardly until the coupling is fitted to the end of the rail, whereupon the flanges 31 snap into place with the lugs 34 securely retained in the notches 37.

Thus, there is provided, in accordance with the present invention, an improved coupling assembly having numerous advantages. It facilitates the assembly process in the course of the manufacture of the vehicle and enables variations in the order of the steps carried out during the assembly. For example, the retractor, the drive, the guide rail and the casing can be installed in various orders, and the only step that needs be carried out as the final step is the final assembly described above. The sealing ring has particular advantages in that it provides assurance against leakage of lubricant from the drive mechanism along the casing to the guide rail and thus avoids the problems that are discussed above. On the other hand, it allows lubricant to enter the casing, thereby providing for smooth movement of the drive wire 12 within the casing and minimizing wear. The sealing ring also serves as a guide which makes for better sliding movement at the place where the drive wire leaves the casing and passes into the guide rail.

The above-described embodiments of the invention are intended to be merely exemplary, and numerous variations and modifications will be readily apparent to those skilled in the art without departing from the spirit and scope of the invention. All such variations and modifications are intended to be included within the scope of the invention, as defined in the appended claims.

I claim:

1. In a passive vehicle occupant restraint belt system having a drive wire received in a casing along the part of its length that is adjacent a guide rail, such part of the drive wire having a covering of polymeric material that carries a lubricant to facilitate movement of the wire longitudinally through the casing, a coupling assembly for joining the casing to the guide rail comprising a coupling member having a socket adapted to receive and retain an end portion of the casing, a connector portion fitted to the guide rail, means for joining the connector portion to the guide rail, a hole through the connector portion communicating the socket with the guide rail and receiving the drive wire for longitudinal movement, and a sealing ring received within the hole in sealing engagement with the drive wire to confine the lubricant to the casing and prevent it from intruding into the guide rail.

2. A coupling assembly according to claim 1 and comprising two parts, each of which defines a portion of the socket and a portion of the hole, and fastener means releasably joining the parts to facilitate disassembling the connector for service or repair of the belt system.

3. A coupling assembly according to claim 1 or claim 2 wherein the joining means includes at least one resilient lug having a projection that fits into a recess in the guide rail.

4. A coupling assembly according to claim 1 or claim 2 wherein the sealing ring is composed of an elastomeric material that is resistant to deterioration when exposed to a petroleum-based lubricant.

* * * * *